Feb. 11, 1930.　　　　　J. F. WAIT　　　　　1,746,687
PROCESS OF CARRYING OUT CHEMICAL REACTIONS UNDER PRESSURE
Filed Dec. 18, 1924
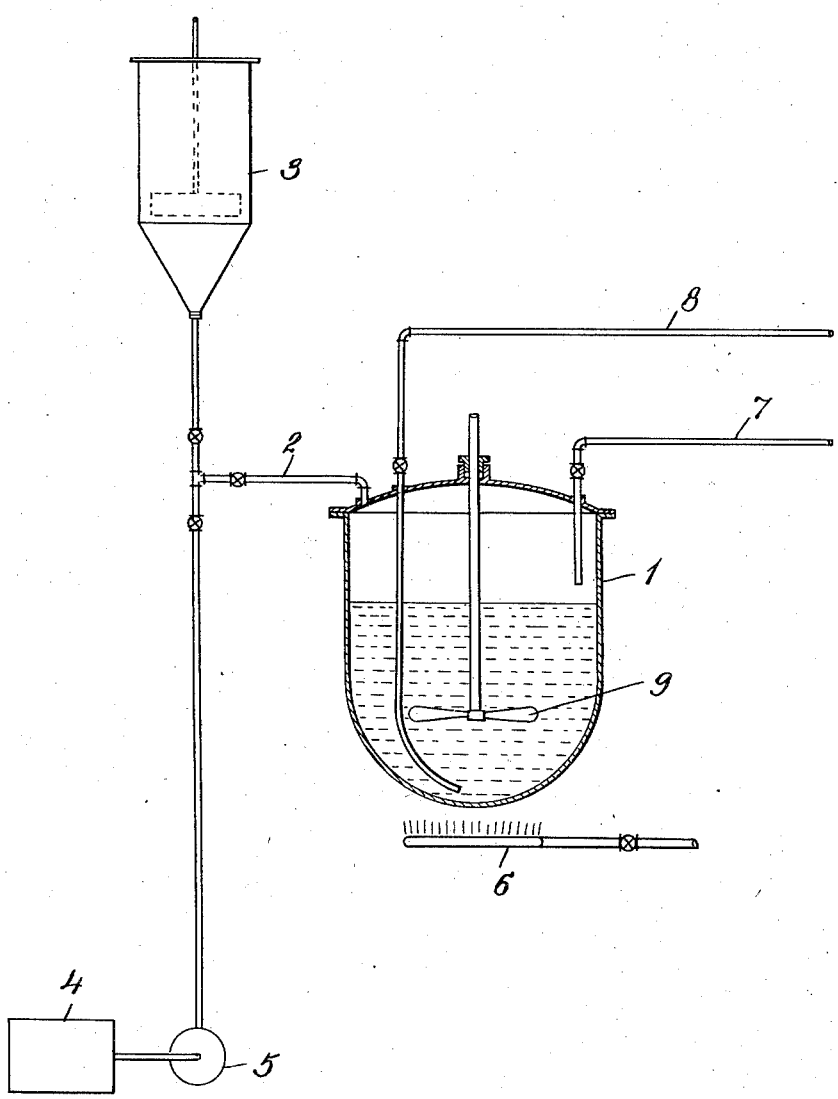
INVENTOR
BY
ATTORNEY Patented Feb. 11, 1930

1,746,687

UNITED STATES PATENT OFFICE

JUSTIN F. WAIT, OF NEW YORK, N. Y., ASSIGNOR TO NATIONAL ANILINE & CHEMICAL CO., INC., A CORPORATION OF NEW YORK

PROCESS OF CARRYING OUT CHEMICAL REACTIONS UNDER PRESSURE

Application filed December 18, 1924. Serial No. 756,799.

This invention relates to a method of carrying out chemical processes at pressures above atmospheric. By this invention the operation of the process is facilitated and the temperatures at which it is desired to carry out the process are controlled.

In prior operations of vessels used for pressure reactions, commonly called autoclaves, where the temperatures and pressure are kept high, the autoclaves are usually charged with the materials that are to undergo reaction, the ports or openings are closed and the autoclave is ordinarily heated by applying heat to the outside thereof. After the required temperatures and pressures have been maintained for the proper length of time, the products are allowed to cool and are then removed. Heating the autoclave from the outside often causes local overheating of the vessel or excessive heating of certain parts of the charge as well as requiring a long interval of time.

By the present invention the time for carrying out the desired reactions is decreased and the temperatures and pressures are better controlled. This is done by injecting steam or other vapors thus utilizing the latent heat of condensation of the vapors to increase the temperature, and the condensates from the vapors may also be used as a solvent or diluent for the substances thereby promoting the desired reactions. In addition to increasing the temperature by the heat introduced in the vapors, additional heat may be added from an external source as, for example, by an electrical heater or a heating coil or gas burner. In some instances, it may be desired to superheat the vapors that are to be introduced, or to compress the same before they are introduced. The amount of heat added by the vapors may be closely controlled by regulating the temperature and pressure as well as the amount of the vapors that are introduced.

After the mass in the closed vessel has been brought to the desired temperature and pressure and maintained for a sufficiently long time to cause the desired reactions to take place, the contents of the vessel may be discharged by causing the pressure in the vessel to force the contents out.

The invention will be readily understood from the description in connection with the accompanying drawing which shows somewhat diagrammatically an arrangement of apparatus by which the process can be carried out.

In the drawing reference character 1 represents a closed vessel or autoclave which has leading thereinto a feed line 2. This feed line may receive materials from the mixer 3 or from the source 4 from which a pump 5 feeds the material into the autoclave. The autoclave is also provided with means for heating the same as, for example, the gas burner 6. A valved inlet line 7 is shown for conducting vapors or steam into the vessel and an outlet or discharge line 8 leads from near the lower portion of the vessel to any convenient receptacle. The autoclave may, if desired, be provided with a stirrer 9 of the usual sort so as to keep the contents well mixed.

In operating the device for making anthrarufin, or other hydroxylated anthraquinones, for example, sulfonated anthraquinone, lime and water are charged into the mixing vessel 3 to form a fluid paste. This is allowed to pass into the autoclave 1. The feed valve is then closed and steam is injected through the line 7 to increase the temperature and pressure. The final temperature is held by means of the gas burner 6. The injected steam condenses, liberating heat and the condensed vapors or water are used for dissolving and diluting materials in the reaction. When the reaction has been completed the discharge valve in the line 8 is opened and the pressure within the vessel is used to eject the charge through the line.

With certain types of reaction, as where volatile solvents are used, it is an advantage to charge the autoclave before the same is completely cooled. Thus the solvent is contained in vessel 4. The autoclave is charged while still at a temperature above the boiling point of the solvent. The valves are closed with the exception of that from the feed line 2 and the pump 5 is used to force the solvent from the receiver 4 into the vessel which is at a temperature in excess of the normal boiling point of the liquid. The vaporization of the solvent aids in increasing the pressure.

I claim:

1. In the manufacture of an anthraquinone hydroxy-derivative by the hydrolysis of an anthraquinone sulfonic derivative under pressure in a closed vessel, the improvement which comprises injecting steam under pressure into the reaction mixture under pressure, thereby increasing the temperature and pressure in said vessel.

2. In the manufacture of an anthraquinone hydroxy-derivative by the hydrolysis of an anthraquinone sulfonic derivative under pressure in a closed vessel, the improvement which comprises injecting steam under pressure into the reaction mixture under pressure, thereby increasing the temperature and pressure in said vessel, and externally heating said vessel.

3. In the manufacture of anthrarufin by the hydrolysis of an anthraquinone disulfonic acid under pressure in a closed vessel, the improvement which comprises injecting steam under pressure into the reaction mixture under pressure, thereby increasing the temperature and pressure in said vessel.

4. In the manufacture of anthrarufin by the hydrolysis of an anthraquinone disulfonic acid under pressure in a closed vessel, the improvement which comprises injecting steam under pressure into the reaction mixture under pressure, thereby increasing the temperature and pressure in said vessel, and externally heating said vessel.

In testimony whereof I affix my signature

JUSTIN F. WAIT.